United States Patent
Laroia et al.

(10) Patent No.: US 7,953,417 B2
(45) Date of Patent: May 31, 2011

(54) METHODS AND APPARATUS FOR SELECTING AND SIGNALING A PREFERRED LINK AMONG A PLURALITY OF MAINTAINED WIRELESS COMMUNICATIONS LINKS

(75) Inventors: Rajiv Laroia, Basking Ridge, NJ (US); Pablo Anigstein, Springfield, NJ (US); Arnab Das, Summit, NJ (US); Vladimir Parizhsky, New York, NY (US); Murari Srinivasan, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 744 days.

(21) Appl. No.: 11/267,050

(22) Filed: Nov. 4, 2005

(65) Prior Publication Data

US 2007/0104128 A1 May 10, 2007

(51) Int. Cl.
*H04W 72/00* (2009.01)
(52) U.S. Cl. .................. 455/450; 455/69; 455/452.2
(58) Field of Classification Search .................. 455/450, 455/69, 452.2
See application file for complete search history.

(56) References Cited

U.S. PATENT DOCUMENTS

| 6,381,458 | B1 * | 4/2002 | Frodigh et al. | 455/442 |
| 6,636,735 | B2 * | 10/2003 | Mohebbi | 455/437 |
| 2004/0018852 | A1 | 1/2004 | Burke et al. | |
| 2004/0086027 | A1 * | 5/2004 | Shattil | 375/146 |
| 2004/0185852 | A1 | 9/2004 | Son et al. | |
| 2005/0111397 | A1 * | 5/2005 | Attar et al. | 370/319 |
| 2005/0124344 | A1 | 6/2005 | Laroia et al. | |
| 2005/0207374 | A1 * | 9/2005 | Petrovic et al. | 370/331 |

FOREIGN PATENT DOCUMENTS

| CL | 3721998 | 10/1998 |
| CL | 8581999 | 9/2004 |
| CL | 23432003 | 9/2004 |
| CL | 6382005 | 7/2006 |
| CL | 27342005 | 7/2006 |

OTHER PUBLICATIONS

Jocelyn Chow and Guillermo Garcia, "Macro- and Micro- Mobility Handoffs in Mobile IP Based MBWA Networks," Global Telecommunications Conference, 2004. Globecom '04. IEEE Dallas, TX, USA; Nov. 29-Dec. 3, 2004 Piscataway NJ, USA IEEE vol. 6, Nov. 29, 2004, pp. 3921-3925.
International Search Report, with Written Opinion of the International Searching Authority, dated Apr. 2, 2006 corresponding to International U.S. Appl. No. PCT/US2006/039699; pp. 1-11.

* cited by examiner

*Primary Examiner* — Barry W Taylor
(74) *Attorney, Agent, or Firm* — Raphael Freiwirth

(57) ABSTRACT

Methods and apparatus for maintaining, selecting and indicating a preferred communications link with an access node, e.g., base station, are described.

32 Claims, 12 Drawing Sheets

METHODS AND APPARATUS FOR SELECTING AND SIGNALING A PREFERRED LINK AMONG A PLURALITY OF MAINTAINED WIRELESS COMMUNICATIONS LINKS

FIELD OF THE INVENTION

The present invention relates to wireless communications systems and, more particularly, to methods and apparatus for operating and using wireless terminals that are capable of maintaining communications links with multiple attachment points.

BACKGROUND

Wireless terminals often have better and/or more current information regarding the quality of downlinks than is available to network elements. For example, core elements which are coupled to multiple base stations may have somewhat out-of-date information regarding the quality of particular links corresponding to different base stations to which a wireless terminal may be attached. In addition, core network elements may not be aware of current traffic loading conditions at a base station.

Some wireless terminals have the ability to support multiple wireless communications links at the same time. The different links may be with different attachment points, e.g., base stations or sectors. Because different links may correspond to different physical points of attachment or different frequency bands, the signal conditions on different links maintained at the same time can vary. For purposes of routing traffic it may be desirable to use the link with the better channel conditions at a particular point in time. However, depending on traffic loading in a cell, delays in getting traffic segments assigned or other conditions may make a link with lower channel quality than another link more preferable at a particular point in time.

It would be desirable if the wireless terminal's knowledge of link quality could be used in selecting which link should be used at a particular point in time. It would also be desirable if a base station were allowed a degree of flexibility in selecting which of a plurality of links to use at a particular point in time so that information known to the base station could be used in making a determination as to which link to use to communicate information to a wireless terminal.

In view of the above discussion, it should be appreciated that there is a need for methods of allowing a wireless terminal to influence which one of a plurality of communications links will be used to send downlink signals, e.g., user data such as text, audio and/or image data, etc., to a wireless terminal at a particular point in time.

SUMMARY

Figure 1:
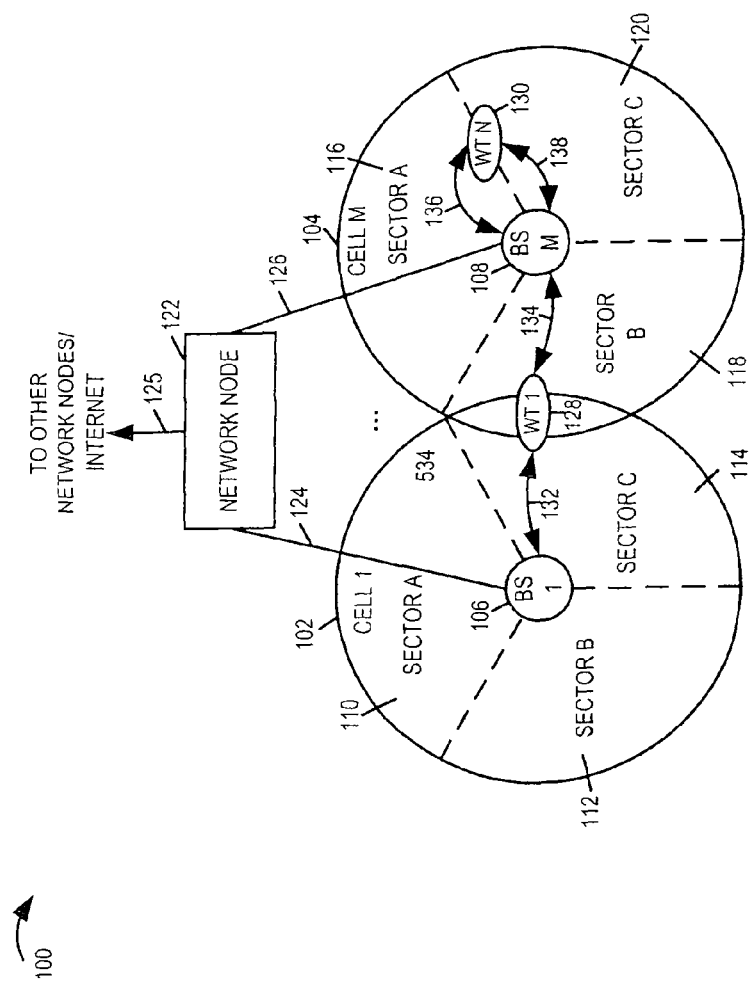
FIG. 1 is a drawing of an exemplary communications system implemented in accordance with the present invention and using methods of the present invention.

Methods and apparatus for maintaining, selecting and indicating a preferred communications link with an access node, e.g., base station, are described.

In accordance with one exemplary embodiment of the invention, a wireless terminal maintains communications links with a plurality of different attachment points at the same time. The wireless terminal makes one or more signal measurements on signals received over the different links. The wireless terminal then selects a preferred downlink wireless communications link from the maintained communications links. The wireless terminal signals to one or more of the attachment points to which it is connected the communications link it has selected as the preferred communications link at a particular point in time. While a preferred link indicator is communicated to an attachment point, it should be appreciated that this signal indicates a link preference, e.g., whether or not the downlink link corresponding to the attachment point is considered to be a preferred link by the wireless terminal. The base station receiving the preferred link indicator is not bound to use an indicated preferred link. For example, in some embodiments, a base station will consider preferred link indicator information along with other information such as, e.g., traffic loading conditions, when deciding whether or not to use a particular downlink link. At some times downlink signals to a wireless terminal may be via a WT designated preferred link, while at other times downlink signals to the wireless terminal may be via a link which has not been designated as a preferred link by the WT.

Signal measurements by the wireless terminal that are used in the preferred link selection process may include signal strength measurements, signal-to-noise ratio (SNR) measurements, signal interference measurements, etc. In some, but not necessarily all, implementations the rate at which a wireless terminal is permitted to change its preferred link selection is limited to prevent rapid or quickly alternating changes in link selection due to, e.g., temporary interference or other transient channel conditions. The rate at which the wireless terminal can change its preferred link selection may also be limited to, e.g., increase the reliability of the base station's detection of said signaling by the wireless terminal.

Base stations receiving the preferred link information can use the preferred link indication in selecting which one of the available downlink connections over which to route downlink signals and traffic, e.g., user data. In addition to preferred link information the base station may consider base station traffic loading and/or other conditions known to the base station in determining which link to use at a particular point in time for downlink traffic.

The preferred link selection and reporting process may occur according to a predetermined schedule, e.g., a schedule corresponding to dedicated uplink control channel slots which may be used to report the wireless terminals selected preferred link to one or more attachment points.

While the mobile node may, and in some embodiments does, select a link with the best link quality as the preferred link, the wireless terminal may take into consideration additional link selection criteria beyond link quality when selecting a preferred link. For example, link latency, link loading and/or other factors associated with a communications link may also be considered in selecting a preferred link.

While various embodiments have been discussed in the summary above, it should be appreciated that not necessarily all embodiments include the same features and some of the features described above are not necessary but can be desirable in some embodiments. Numerous additional features, benefits and embodiments of the present invention are discussed in the detailed description which follows.

DETAILED DESCRIPTION

FIG. 1 is a drawing of an exemplary communications system 100 implemented in accordance with the present invention and using methods of the present invention. Example communications system 100 may be, e.g., an orthogonal frequency division multiplexing (OFDM) spread spectrum multiple access wireless communications system. Exemplary communications system 100 includes a plurality of cells (cell 1 102, cell M 104), each cell (102, 104) representing a wireless coverage area for a corresponding base station (BS 1 106, BS M 108), respectively. Each base station is a sectorized base station supporting a different attachment point for each sector. Cell 1 102 includes sector A 110, sector B 112 and sector C 114; cell M 104 includes sector A 116, sector B 118, and sector C 120. The base stations (106, 108) are coupled to a network node 122, e.g., router, via networks links (124, 126), respectively. Network node 122 is coupled to other network node/Internet via network link 125. Network links (124, 126, 125) may be, e.g., fiber optic links.

Exemplary system 100 also includes a plurality of wireless terminals, e.g., mobile nodes (WT 1 128, WT N 130). The wireless terminals (128, 130) may move throughout the communications system and attach to base station points of attachment. In accordance with the present invention, a WT may be attached to multiple points of attachment simultaneously. Such a WT evaluates channel conditions with respect to the multiple links, selects a preferred link for downlink user data signaling, and communicates its preference to the base station attachment points. WT 1 128 is coupled to sector C attachment point of BS 1 106 via wireless link 132. WT 1 128 is also coupled to sector B attachment point of BS M 108 via wireless link 134. The two sector attachment points being used by WT 1 128 are not co-located, e.g., each sector attachment point is in a different cell. WT N 130 is coupled to sector A attachment point of BS 2 108 via wireless link 136. WT N 130 is also coupled to sector C attachment point of BS M 108 via wireless link 138. The two sector attachment points being used by WT N 130 are co-located, e.g., each sector attachment point is at the same base station. In some embodiments, a base station sector may also support multiple attachment points, e.g., three downlink OFDM tone blocks, with each of the downlink tone blocks corresponding to a different attachment point.

Figure 2:
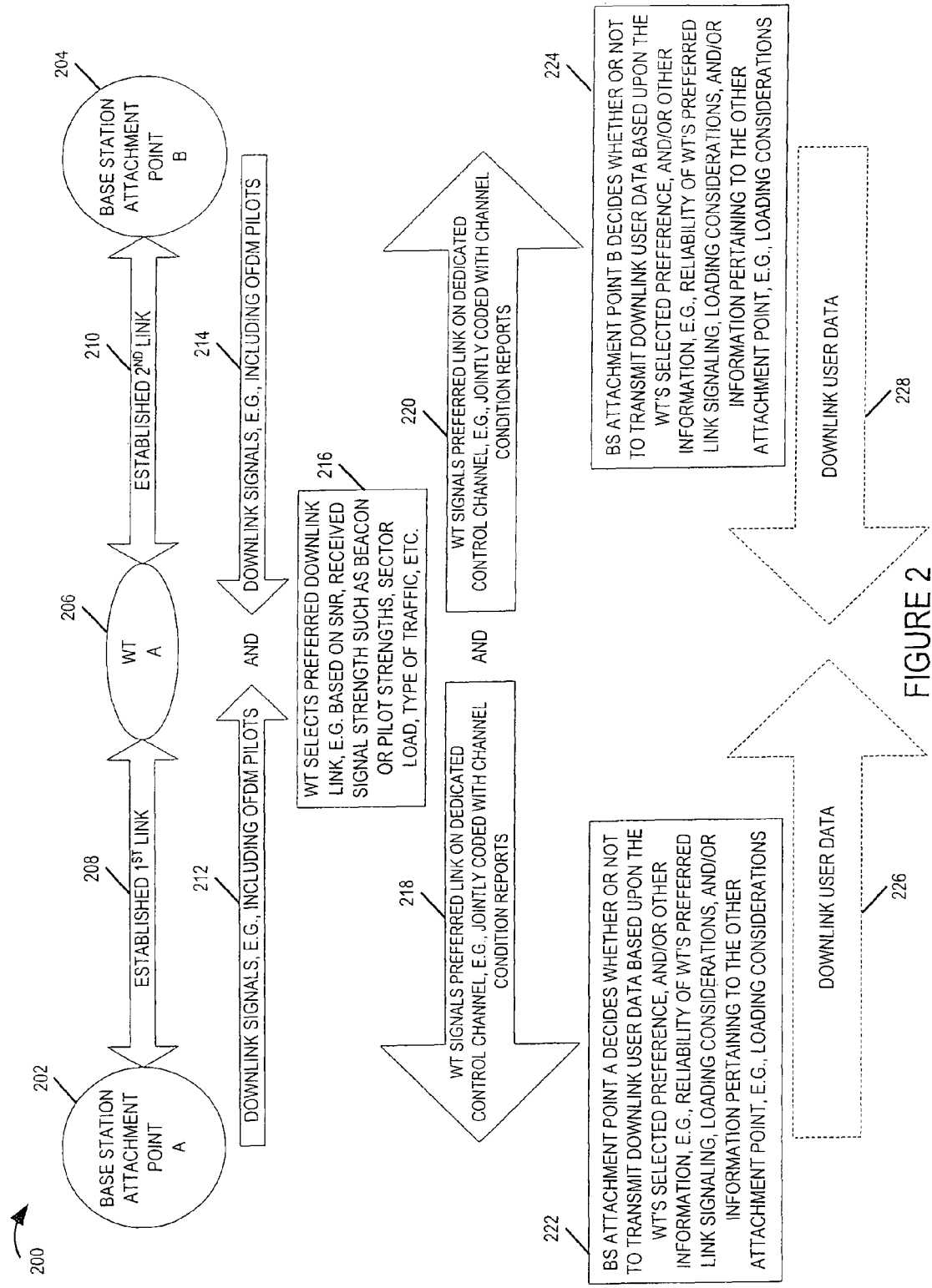
FIG. 2 is a drawing illustrating exemplary signaling and link selections in accordance with the present invention.

FIG. 2 is a drawing 200 illustrating exemplary signaling and link selections in accordance with the present invention. Exemplary WT A 206 is shown with two established wireless links, a $1^{st}$ link 208 coupling WT A 206 to base station attachment point A 202 and a $2^{nd}$ link 210 coupling WT A 206 to base station attachment point B 204. The two base station attachment points A and B may be co-located, e.g., different sectors corresponding to the same base station or different carrier frequencies or tone blocks corresponding to the same base station sector. Alternatively, the two base station attachment points A and B (202, 204) may not be co-located, e.g., corresponding to different adjacent base stations located in adjacent cells.

Each base station attachment point (A 202, B 204) transmits downlink signals (212, 214), respectively. The downlink signals may include, e.g., beacons signals, pilots signals, assignments signals, paging signals, control signals, user data signals. At least some of the transmitted downlink signals (212, 214) are received by the WT A 206 and processed, e.g., determining at least one of received signal strength such as received pilot signal strength or received beacon signal strength, signal-to-noise ratio (SNR), signal-to-interference ratio (SIR), sector load and type of traffic such as voice or data, corresponding to each set of signals (212, 214). In some embodiments, downlink signals are received and processed from other base station points of attachment, e.g., additional beacon signals from a base station point of attachment not currently associated with an established link but which are used in generating beacon ratio reports or determining SNR or SIR.

In block 216, the WT A 206, having received and processed the downlink signals (212, 214), selects a preferred link to use over which to communicate downlink user data signals to the WT. The preferred link selection, in accordance with the present invention, depends upon at least one of the following: SNR, SIR, received signal strength, beacon strengths, sector load, and type of traffic. In some embodiments, the selection is based upon present as well as past conditions. Arrow 218 indicates the WT A 206 signals its preferred link to base station attachment point A 202 on a dedicated control channel, e.g., a dedicated uplink tone in the timing and frequency structure being used by BS attachment point A, which has been assigned by BS attachment point A to WT A 206. In some embodiments, a wireless terminal can operate at different times in different modes of dedicated control channel operation, e.g., a full DCCH mode where the wireless terminal is assigned an uplink logical tone for its exclusive use and a ⅓ DCCH mode of operation where the wireless terminal shares an assigned uplink logical tone with other wireless tones. The rate of the preferred link signaling is, in some embodiments, a function of the wireless terminal mode of operation. In accordance with various embodiments of the present invention, the WT preferred link indication is jointly coded with channel condition reports, e.g., SNR reports, beacon ratio reports, etc. In accordance with some embodiments of the present invention, the signaling is performed periodically on the dedicated control channel. Arrow 220 indicates the WT A 206 signals its preferred link to base station network attachment point B 202 on the dedicated control channel, e.g., a dedicated uplink tone in the timing and frequency structure being used by BS attachment point B, which has been assigned by BS attachment point B to WT A 206.

Block 222 indicates that BS attachment point A 202 decides whether or not to transmit downlink user data to WT A 206 based on the WT's selected preference, and in some embodiments under certain condition, information pertaining to BS attachment point A 202, and/or information pertaining to the other attachment point being used simultaneously by WT A 206. For example, BS attachment point A usually transmits downlink user data to WT A 206 when its link 208 has been selected as the preferred link; however, it can also choose to transmit to WT A 206 when its link 208 is not the preferred link, e.g., at a reduced rate. Situations where base station attachment point A 202, not having its link 208 selected as the preferred link, might choose to transmit downlink user data to WT A 206 include, e.g., (i) if the non-preferred link 208 is unloaded or lightly loaded, and/or (ii) if the non-preferred link 208 is unloaded or lightly loaded, while the designated preferred link 210 is congested, and/or (iii) if WT A's signal 218 of its preferred link to base station attachment point A 202 is deemed unreliable by base station attachment point A 202. Block 224 similarly indicates that BS network attachment point B 204 decides whether or not to transmit downlink user data to WT A 206 based on the WT's selected preference, and in some embodiments under certain condition, information pertaining to the other attachment point being used simultaneously by WT A 206.

Dashed arrows 226 and 228 indicate that one or more of the base station attachment points (202, 204) transmits downlink user data to WT A 206, e.g., in accordance with the decisions of steps 222 and 224. It is possible that both base station attachment points (202, 204) simultaneously transmits downlink user data to WT A 206, while WT A 206 has only one preferred link at any given time.

Figure 3:
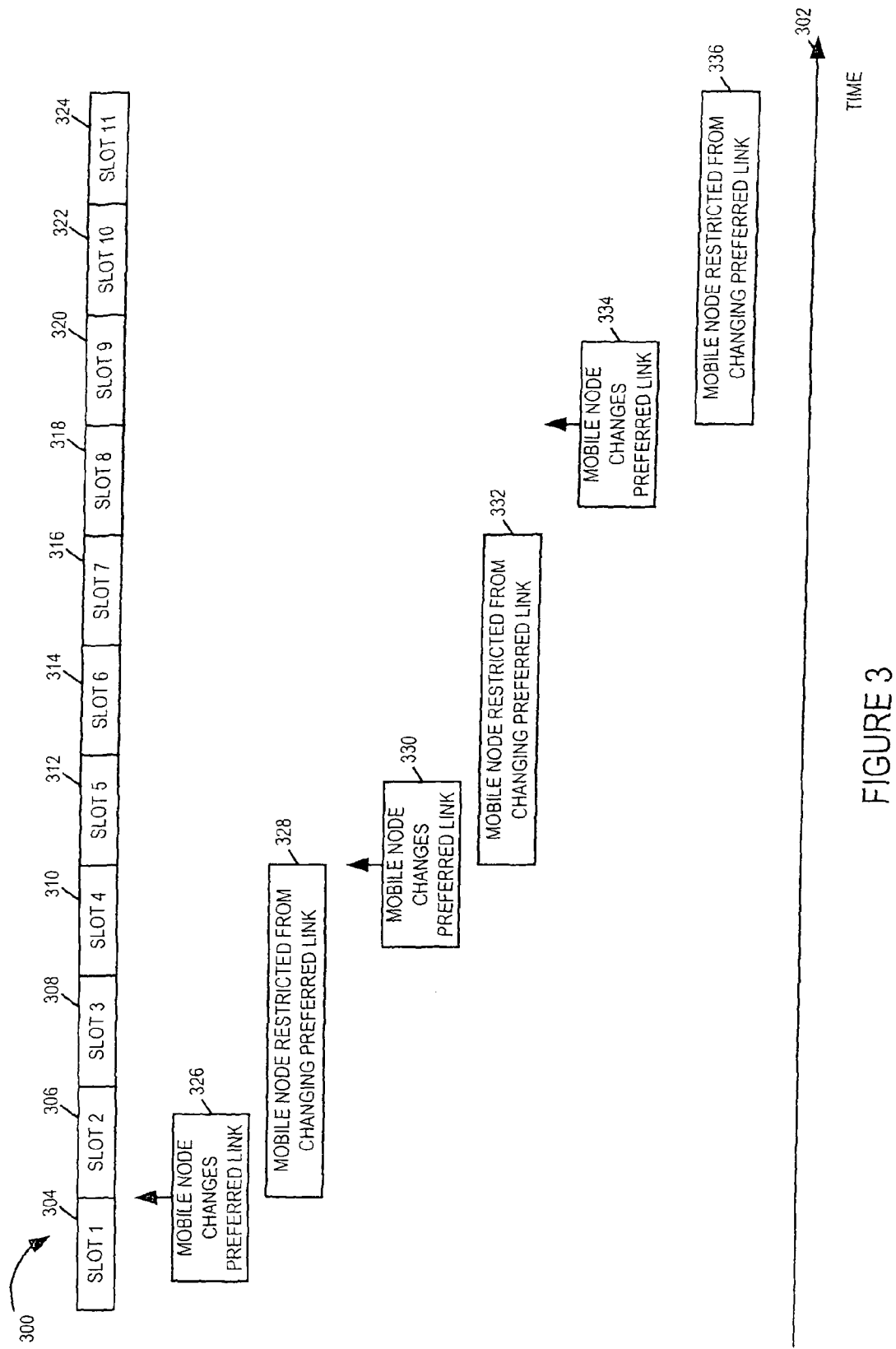
FIG. 3 is a drawing indicating an exemplary embodiment in accordance with the present invention where there is a level of hysteresis in the change of the preferred link.

FIG. 3 is a drawing 300 indicating an exemplary embodiment in accordance with the present invention where there is a level of hysteresis in the change of the preferred link. In some embodiment, the mobile node is required to hold the preferred link for at least N consecutive slots, where N is a positive integer greater than 1. For example, in the exemplary embodiment of FIG. 3, N=3. FIG. 300 includes a horizontal axis 302 representing time. Eleven consecutive exemplary slots are shown (slot 1 304, slot 2 306, slot 3 308, slot 4 310, slot 5 312, slot 6 314, slot 7 316, slot 8 318, slot 9 320, slot 10 322, slot 11 324). Block 326 indicates that the mobile node changes the preferred link at the boundary between slot 1 and slot 2. Block 328 indicates that the MN is restricted from changing the preferred link for a duration of 3 slots (slot 2-slot 4). Block 330 indicates that at the boundary between slot 4 and slot 5, the MN again changes the preferred link. Block 332 indicates that the MN is restricted from changing the preferred link for a duration of 3 slots (slot 5-slot 7). Block 334 indicates that the MN changes the preferred link at the boundary between slot 8 and slot 9, e.g., because the switching criteria has been satisfied and the restriction from switching has expired. Note, that the mobile could have changed the preferred link starting with the boundary between block 7 and 8, if the switching criteria had been satisfied. Block 336 indicates that the MN is restricted from changing the preferred link for a duration of 3 slots, with the restriction being lifted at the end of slot 11.

Figure 4:
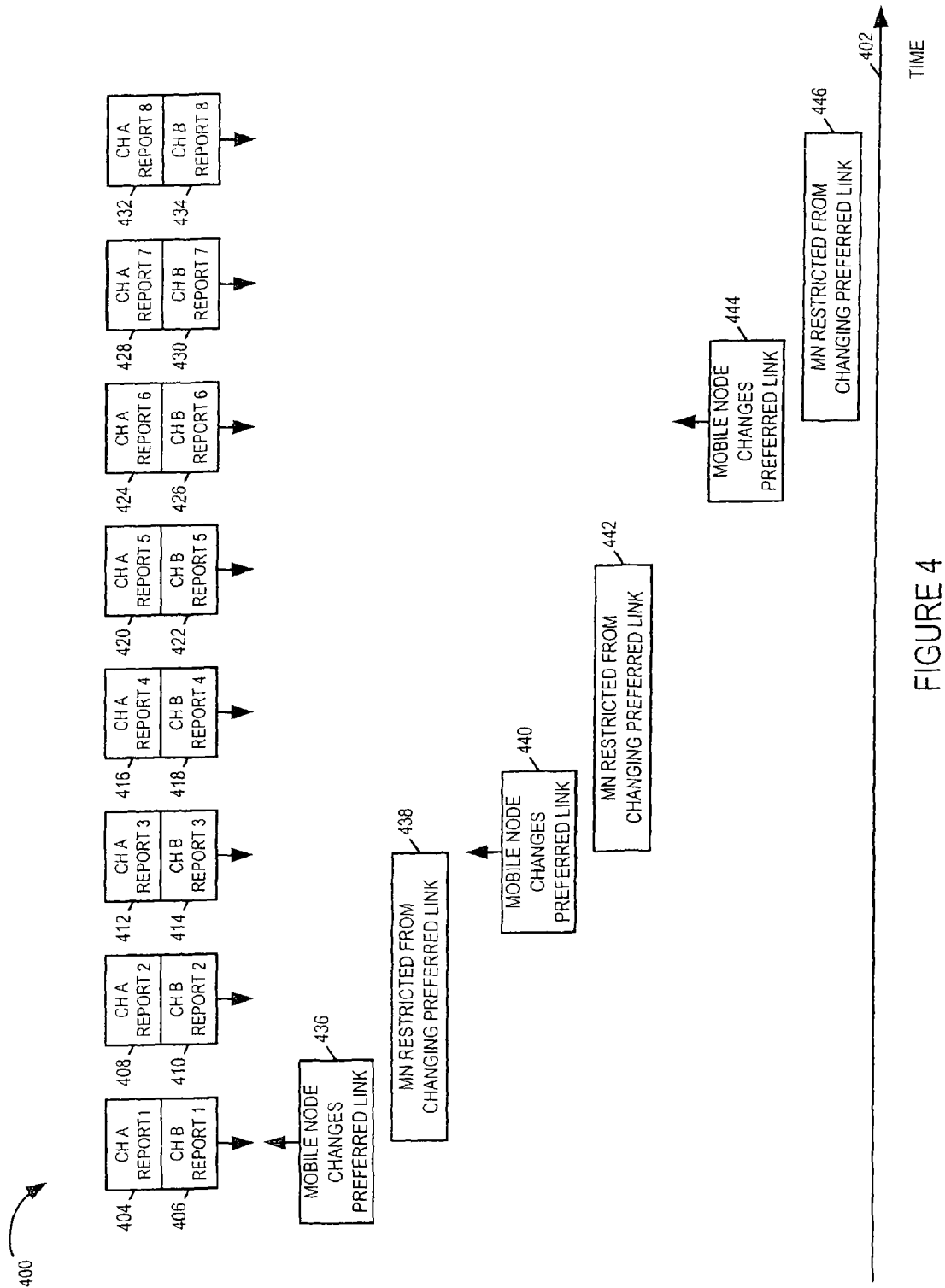
FIG. 4 is a drawing indicating another exemplary embodiment in accordance with the present invention where there is a level of hysteresis in the change of the preferred link.

FIG. 4 is a drawing 400 indicating an exemplary embodiment in accordance with the present invention where there is a level of hysteresis in the change of the preferred link. In some embodiments, the mobile node is required to hold the preferred link for at least N consecutive sets of channel reports, where N is a positive integer greater than 1. For example, in the exemplary embodiment of FIG. 4, N=2. Drawing 400 includes a horizontal axis 402 representing time. Eight consecutive exemplary sets of channel reports are shown ($1^{st}$ channel report A 404, $1^{st}$ channel report B 406), ($2^{nd}$ channel report A 408, $2^{nd}$ channel report B 410), ($3^{rd}$ channel report A 412, $3^{rd}$ channel report B 414), ($4^{st}$ channel report A 416, $4^{th}$ channel report B 418), ($5^{th}$ channel report A 420, $5^{th}$ channel report B 422), ($6^{th}$ channel report A 424, $6^{th}$ channel report B 426), ($7^{th}$ channel report A 428, $7^{th}$ channel report B 430), ($8^{th}$ channel report A 432, $8^{th}$ channel report B 434). Block 426 indicates that the mobile node changes the preferred link at a time corresponding to the $1^{st}$ set of channel reports (404/406). Block 438 indicates that the MN is restricted from changing the preferred link for a duration of 2 channel report intervals. Block 440 indicates that at the time corresponding to the third set of channel reports (412/414), the MN again changes the preferred link. Block 442 indicates that the MN is restricted from changing the preferred link for a duration of 2 channel report intervals. Block 444 indicates that the MN changes the preferred link at the time corresponding to the $6^{th}$ set of channel reports (424/426), e.g., because the switching criteria has been satisfied and the restriction from switching has expired. Note, once the restriction expires, the MN can, but does not have to, change the preferred link. For example, the mobile could have changed the preferred link starting with the time corresponding to the $5^{th}$ set of channel reports, because the switching criteria had been satisfied, but the MN decides not to change it. Block 446 indicates that the MN is restricted from changing the preferred link for a duration 2 channel report intervals.

Figure 5:
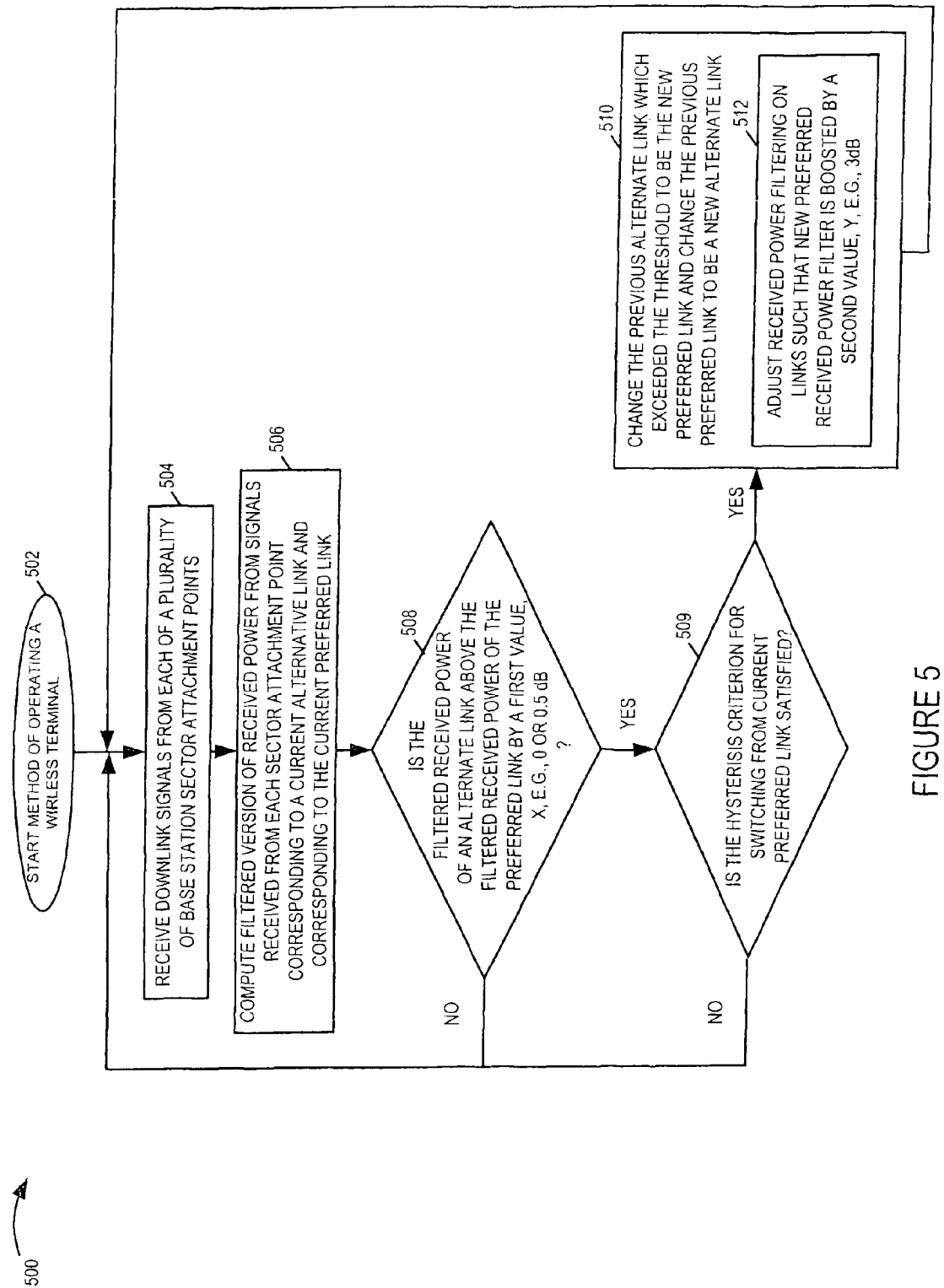
FIG. 5 is a flowchart of an exemplary method of operating a wireless terminal in accordance with the present invention.

FIG. 5 is a flowchart 500 of an exemplary method of operating a wireless terminal in accordance with the present invention. Operation starts in step 502, where the wireless terminal has been previously powered on initialized, registered with two base station points of attachment, and established two wireless links, one of the links being designated as the preferred link and the other link being designated as the alternate link. Operation proceeds from step 502 to step 504.

In step 504 the wireless terminal is operated to receive downlink signals from each of a plurality of base station sector attachment points. Operation proceeds from step 504 to step 506, where the wireless terminal is operated to compute a filtered version of received power from signals received from each sector attachment point corresponding to a current alternative link and the sector attachment point corresponding to the current preferred link. Operation proceeds from step 506 to step 508.

In step 508, the wireless terminal checks if the filtered received power of an alternative link is above the filtered received power of the preferred link by a first value X, e.g., 0 or 0.5 dB. If the filtered received power of an alternative link exceeded the currently preferred link by at least the value X, then operation proceeds to step 509; otherwise, operation returns to step 504.

In step 509, the wireless terminal checks if a hysterisis criterion for switching from the current preferred link is satisfied. For example, the wireless terminal may be required to signal the same preferred link indicator value to the current preferred link for at least N1 successive time intervals before being allowed to change the signaled preferred link indicator value to an alternate link. If the hysterisis criterion is satisfied, then operation proceeds to step 510; otherwise, operation returns to step 504.

In step 510, the wireless terminal is operated to: (i) change the previous alternate link which exceeded the threshold in step 508 to be the new preferred link and (ii) change the previous preferred link to be a new alternate link. Step 510 includes sub-step 512. In sub-step 512, the wireless terminal is operated to adjust the received power filtering on links such that the new preferred received power is boosted by a second value, Y, e.g., 3 dB. In some embodiments, this additional boosting of the new preferred received power filter may be an initial increase in gain which decays over time. The values X and Y are selected, in accordance with the present invention, such as to provide hysteresis.

As an alternative approach to changing filter parameters due to a decision to switch preferred links, in some embodiments, the switching criteria is adjusted as a function of time from the last switch point. For example, the switching criteria immediately following a switch may be set to a difference of 3 dB, and that switching criteria may be controlled to decay over time to a lower limit of 0.5 dB or 0 dB.

Figure 6:
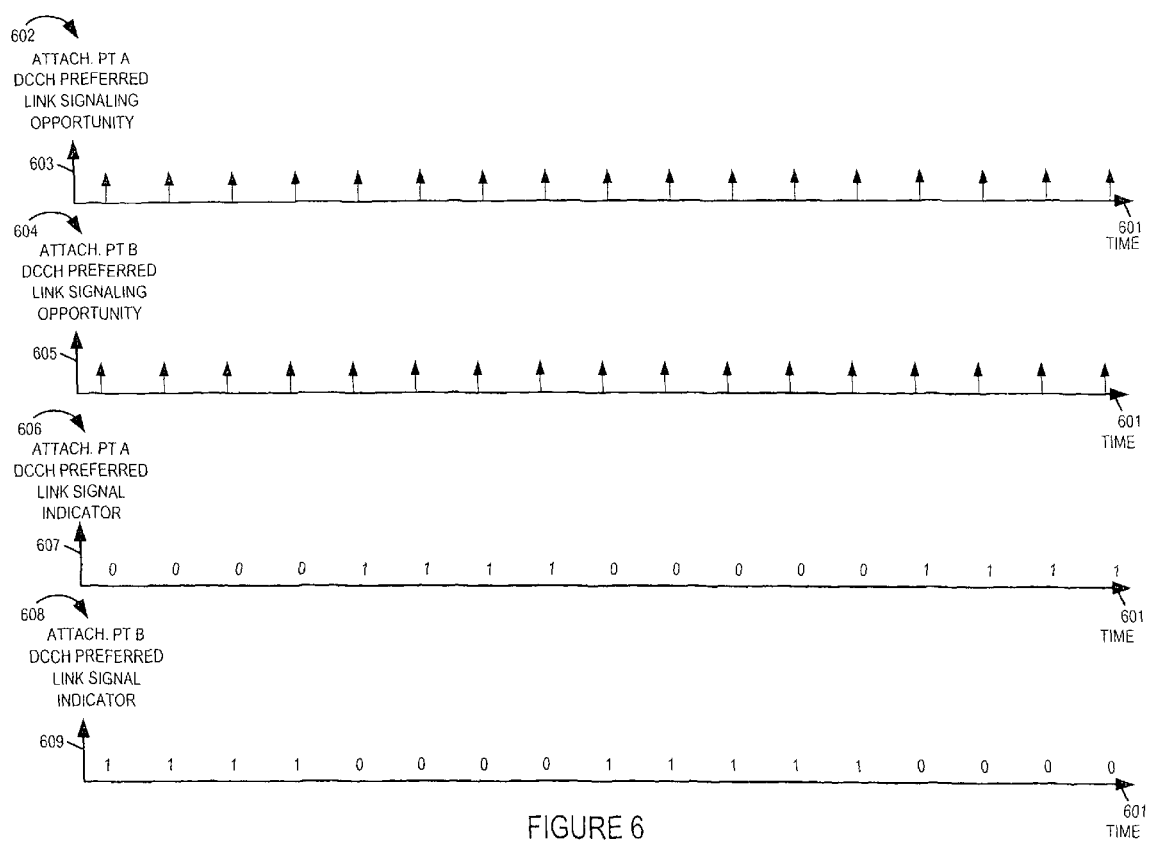
FIG. 6 is a drawing indicating an exemplary embodiment in accordance with the present invention where there is a level of hysteresis in the change of the preferred link.

FIG. 6 is a set of drawings indicating an exemplary embodiment in accordance with the present invention where there is a level of hysteresis in the change of the preferred link. In some embodiments, the mobile node is required to signal the preferred link for N consecutive signaling opportunities before being permitted to signal another preferred link, where N is a positive integer greater than 1. For example, in the exemplary embodiment of FIG. 6, N=4. Drawing 602 includes a vertical axis 603, representing attachment point A dedicated control channel preferred link signaling opportunities vs a horizontal axis 601 representing time. Drawing 602 illustrates 17 successive signaling opportunities for signaling attachment point A with a preferred link indicator. Drawing 604 includes a vertical axis 605, representing attachment point B dedicated control channel preferred link signaling opportunities vs a horizontal axis 601 representing time. Drawing 604 illustrates 17 successive signaling opportunities for signaling attachment point A with a preferred link indicator.

Drawing 606 includes a vertical axis 607 representing attachment point A dedicated control channel preferred link signal indicator vs a horizontal axis 601 representing time. Each indicator value of drawing 606 corresponds to a signaling opportunity of drawing 602. Drawing 606 indicates a pattern of indicator signals (0, 0, 0, 0, 1, 1, 1, 1, 0, 0, 0, 0, 0, 1, 1, 1, 1), where an indicator value=1 indicates that the established link corresponding to attachment point A is the preferred link for downlink user data signaling, while an indicator value=0 indicates that the established link corresponding to attachment point A is not the preferred link for downlink user data signaling. Note that, the same preferred link signaling indicator value is signaled successively for (4, 5, 4) times, each exemplary set of successive signaling using at least four successive signaling opportunities, in accordance with a criteria used in this exemplary embodiment.

Drawing 608 includes a vertical axis 609 representing attachment point B dedicated control channel preferred link signal indicator vs a horizontal axis 601 representing time. Each indicator value of drawing 608 corresponds to a signaling opportunity of drawing 604. Drawing 608 indicates a pattern of indicator signals (1, 1, 1, 1, 0, 0, 0, 0, 1, 1, 1, 1, 1, 0, 0, 0, 0), where an indicator value=1 indicates that the established link corresponding to attachment point B is the preferred link for downlink user data signaling, while an indicator value=0 indicates that the established link corresponding to attachment point B is not the preferred link for downlink user data signaling. Note that the same preferred link signaling indicator value is signaled successively for (4, 5, 4) times, each exemplary set of successive signaling using at least four successive signaling opportunities, in accordance with a criteria used in this exemplary embodiment.

In some embodiments, a mobile can signal that there is no preferred link at a given point in time. It is also possible, in some embodiments, for a mobile to indicate multiple preferred links at a given point in time.

Figure 7:
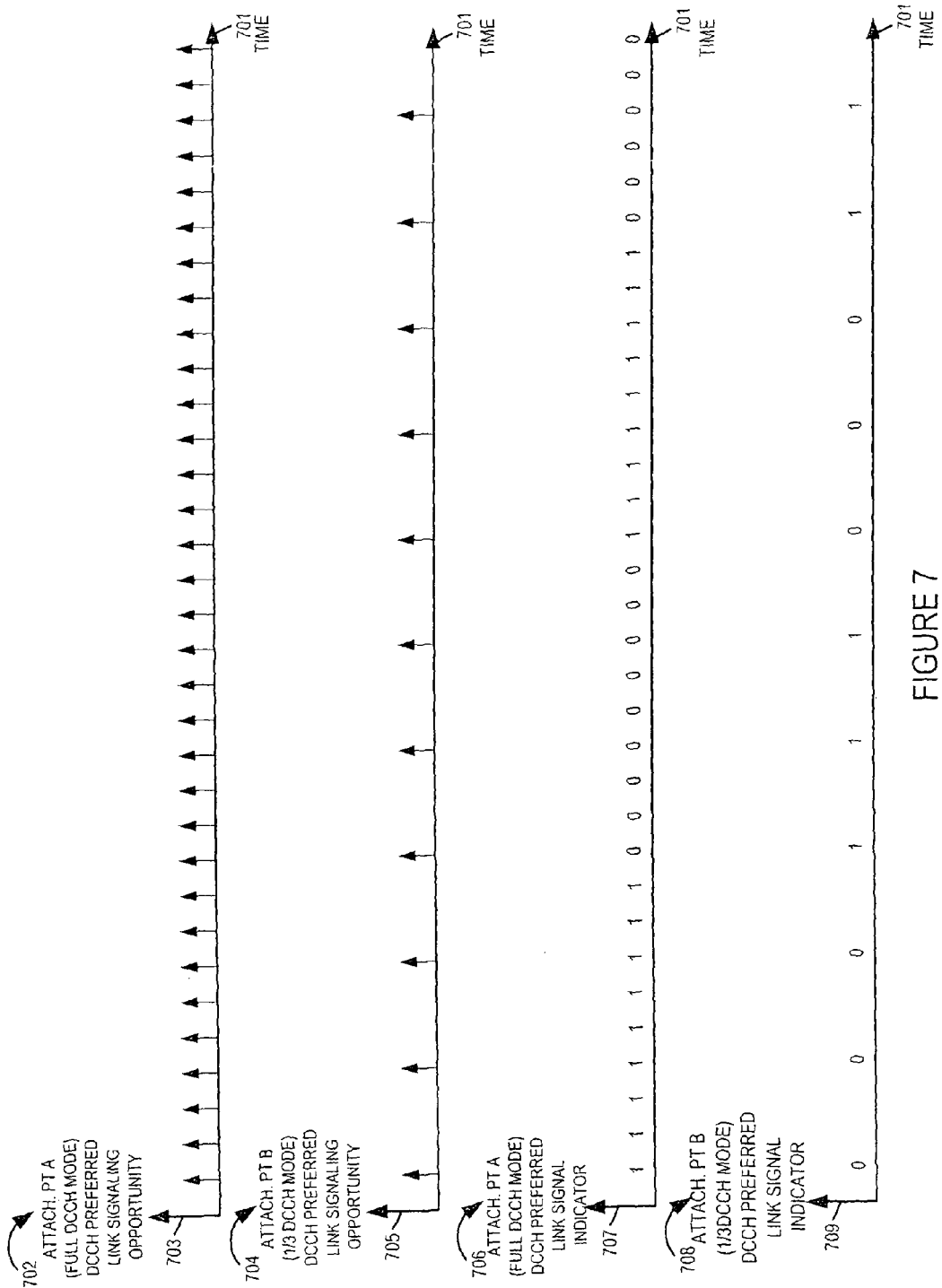
FIG. 7 is a drawing indicating another exemplary embodiment in accordance with the present invention where there is a level of hysteresis in the change of the preferred link.

FIG. 7 is a set of drawings indicating an exemplary embodiment in accordance with the present invention where there is a level of hysteresis in the change of the preferred link. In the exemplary embodiment of FIG. 7, the mobile node is operating in a full dedicated control channel mode of operation with respect to attachment point A and is operating in a 1/3 dedicated control channel mode of operation with respect to attachment point B, each mode supporting different uplink signaling rates with respect to communicating a preferred link to use for downlink user data signaling. In accordance with various embodiments of the invention, under conditions of mixed mode operation, the mobile node signals the same preferred link indicator value for at least N successive time intervals, where N is a positive integer greater than 1, before being allowed to change the signaled preferred link indicator value to the attachment point corresponding to the uplink dedicated control channel using the lower signaling rate. The signaling to the other attachment point using the higher uplink signaling rate is, in some embodiments, set to coincide with the information communicated via the low signaling rate channel.

For example, in the exemplary embodiment of FIG. 7, N=3. Drawing 702 includes a vertical axis 703, representing attachment point A dedicated control channel, operating in full DCCH mode, preferred link signaling opportunities vs a horizontal axis 701 representing time. Drawing 702 illustrates 33 successive signaling opportunities for signaling attachment point A with a preferred link indicator. Drawing 704 includes a vertical axis 705, representing attachment point B, operating in a 1/3 DCCH mode, dedicated control channel preferred link signaling opportunities vs a horizontal axis 701 representing time. Drawing 704 illustrates 11 successive signaling opportunities for signaling attachment point B with a preferred link indicator.

Drawing 706 includes a vertical axis 707 representing attachment point A dedicated control channel preferred link signal indicator vs a horizontal axis 701 representing time. Each indicator value of drawing 706 corresponds to a signaling opportunity of drawing 702. Drawing 706 indicates a pattern of indicator signals (1, 1, 1, 1, 1, 1, 1, 1, 1, 0, 0, 0, 0, 0, 0, 0, 0, 0, 1, 1, 1, 1, 1, 1, 1, 1, 0, 0, 0, 0, 0, 0, 0) where an indicator value=1 indicates that the established link corresponding to attachment point A is the preferred link for downlink user data signaling, while an indicator value=0 indicates that the established link corresponding to attachment point A is not the preferred link for downlink user data signaling.

Drawing 708 includes a vertical axis 709 representing attachment point B dedicated control channel preferred link signal indicator vs a horizontal axis 701 representing time. Each indicator value of drawing 708 corresponds to a signaling opportunity of drawing 704. Drawing 708 indicates a pattern of indicator signals (0, 0, 0, 1, 1, 1, 0, 0, 0, 1, 1), where an indicator value=1 indicates that the established link corresponding to attachment point B is the preferred link for downlink user data signaling, while an indicator value=0 indicates that the established link corresponding to attachment point B is not the preferred link for downlink user data signaling. Note that, the same preferred link signaling indicator value is signaled successively for at least three times before changing to another indicator value, in accordance with a criteria used in this exemplary embodiment. Note that the indicator pattern of drawing 706 has been set so as to achieve consistency in preferred link assignment between the two attachment points.

Figure 8:
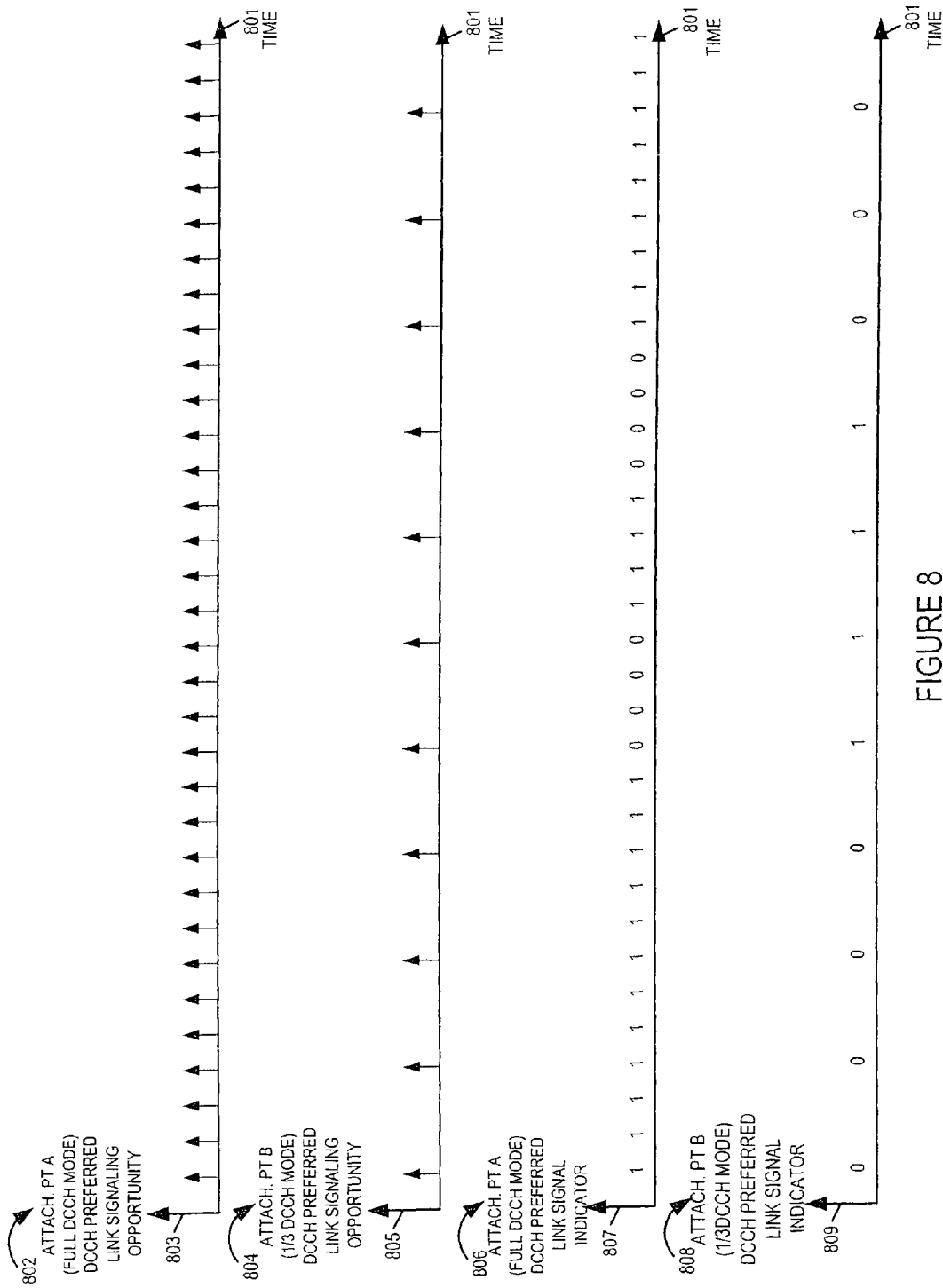
FIG. 8 is a drawing indicating an exemplary embodiment in accordance with the present invention where there is a level of hysteresis in the change of the preferred link.

FIG. 8 is a set of drawings indicating an exemplary embodiment in accordance with the present invention where there is a level of hysteresis in the change of the preferred link. In the exemplary embodiment of FIG. 8, the mobile node is operating in a full dedicated control channel mode of operation with respect to attachment point A and is operating in a ⅓ dedicated control channel mode of operation with respect to attachment point B, each mode supporting different uplink signaling rates with respect to communicating a preferred link to use for downlink user data signaling. In accordance with various embodiments of the invention, under conditions of mixed mode operation, the mobile node signals the same preferred link indicator value for at least N1 successive time intervals, where N1 is a positive integer greater than 1, before being allowed to change the signaled preferred link indicator value to the attachment point corresponding to the uplink dedicated control channel using the lower signaling rate, and the mobile node signals the same preferred link indicator value for at least N2 successive time intervals, where N2 is a positive integer greater than 1, before being allowed to change the signaled preferred link indicator value to the attachment point corresponding to the uplink dedicated control channel using the higher signaling rate. In some such embodiments N1=N2. For example, in the exemplary embodiment of FIG. 8, N1=N2=4.

In some embodiment, the value of N1 or N2 depends on the modes of the uplink dedicated control channels associated with attachment points A and B, and is pre-determined. In another embodiment, the value of N1 or N2 can be configurable and vary as a function of the traffic of the MN.

Drawing 802 includes a vertical axis 803, representing attachment point A dedicated control channel, operating in full DCCH mode, preferred link signaling opportunities vs a horizontal axis 801 representing time. Drawing 802 illustrates 33 successive signaling opportunities for signaling attachment point A with a preferred link indicator. Drawing 804 includes a vertical axis 805, representing attachment point B, operating in a ⅓ DCCH mode, dedicated control channel preferred link signaling opportunities vs a horizontal axis 801 representing time. Drawing 804 illustrates 11 successive signaling opportunities for signaling attachment point B with a preferred link indicator.

Drawing 806 includes a vertical axis 807 representing attachment point A dedicated control channel preferred link signal indicator vs a horizontal axis 801 representing time. Each indicator value of drawing 806 corresponds to a signaling opportunity of drawing 802. Drawing 806 indicates a pattern of indicator signals (1, 1, 1, 1, 1, 1, 1, 1, 1, 1, 1, 1, 0, 0, 0, 0, 1, 1, 1, 1, 0, 0, 0, 0, 1, 1, 1, 1, 1, 1, 1, 1, 1) where an indicator value=1 indicates that the established link corresponding to attachment point A is the preferred link for downlink user data signaling, while an indicator value=0 indicates that the established link corresponding to attachment point A is not the preferred link for downlink user data signaling.

Drawing 808 includes a vertical axis 809 representing attachment point B dedicated control channel preferred link signal indicator vs a horizontal axis 801 representing time. Each indicator value of drawing 808 corresponds to a signaling opportunity of drawing 804. Drawing 808 indicates a pattern of indicator signals (0, 0, 0, 0, 1, 1, 1, 1, 0, 0, 0), where an indicator value=1 indicates that the established link corresponding to attachment point B is the preferred link for downlink user data signaling, while an indicator value=0 indicates that the established link corresponding to attachment point B is not the preferred link for downlink user data signaling.

Note that, the same preferred link signaling indicator value is signaled successively for at least four times before changing to another indicator value for a given attachment point, in accordance with a criteria used in this exemplary embodiment. In this exemplary embodiment, there are some instances where the two different points of attachment each may have each have a different understanding as to which link is the preferred link.

Figure 9:
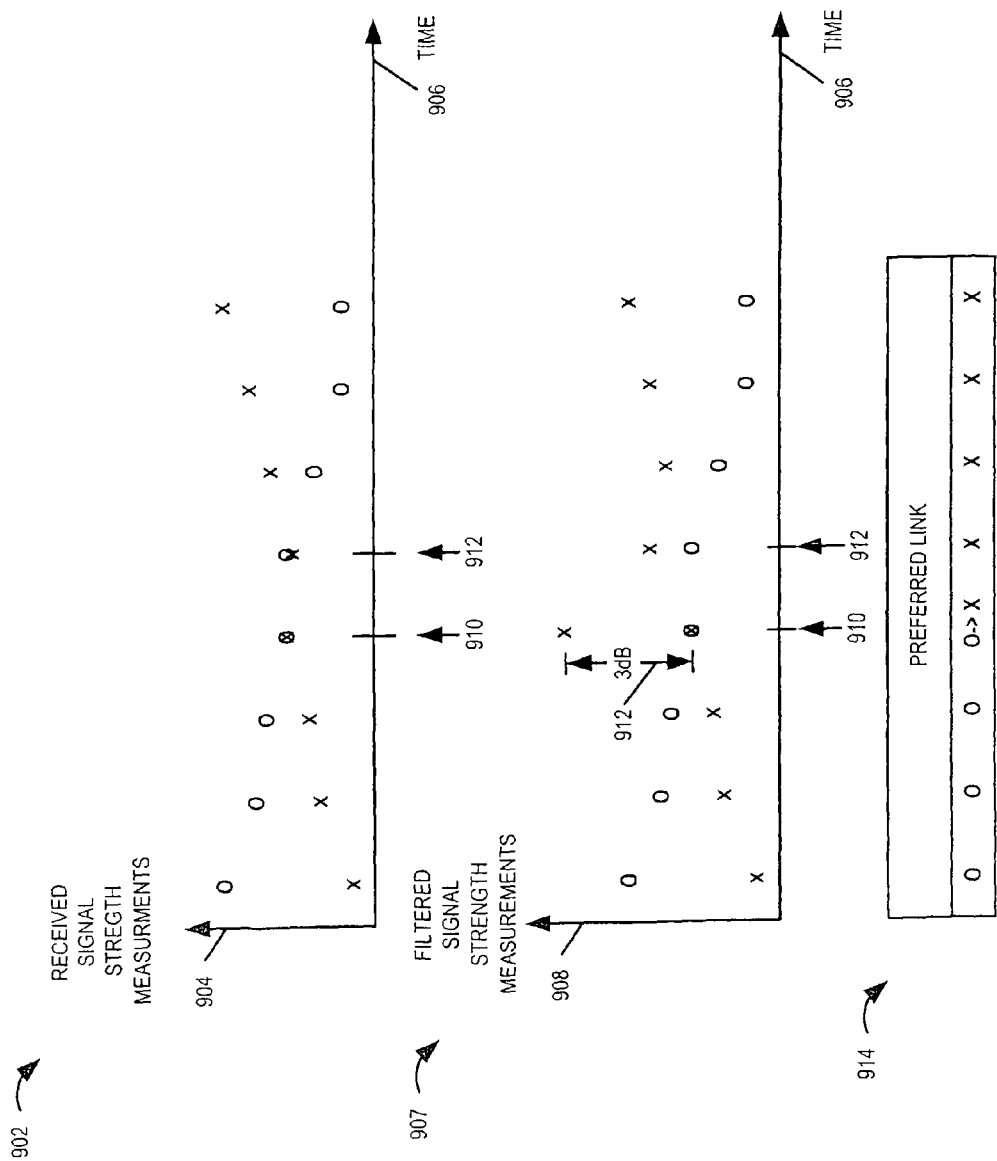
FIG. 9 includes drawings illustrating an example of filtered signal strength measurements being used by a wireless terminal to determine a preferred downlink link, in accordance with the present invention.

FIG. 9 includes drawings illustrating an example of filtered signal strength measurements being used by a wireless terminal to determine a preferred downlink link, in accordance with the present invention. Drawing 906 is a plot of received signal strength measurements on the vertical axis 904 vs time on the horizontal axis 906 for two exemplary established links coupling an exemplary wireless terminal to two attachment points. Points indicated by symbol O on graph 902 indicate the measured signal strength of pilot signals from attachment point O as a function of time. Points indicated by symbol X on graph 902 indicate the measured signal strength of pilot signals from attachment point X as a function of time. Drawing 907, which corresponds to drawing 902, is a plot of filtered received signal strength measurements on the vertical axis 908 vs time on the horizontal axis 906 for the two exemplary established links coupling the exemplary wireless terminal to the two network attachment points. Points indicated by symbol O on graph 907 indicate the filtered signal strength of pilot signals from attachment point O as a function of time. Points indicated by symbol X on graph 907 indicate the filtered signal strength of pilot signals from attachment point X as a function of time. Table 914 indicates the wireless terminal's preferred link as a function of time and corresponds to drawing 907.

In this exemplary embodiment preferred link switching decisions are based on a comparison of the filtered measured signal strength. For example, when the filtered strength of an alternate link equals or exceeds the filtered strength of the current preferred link, the alternate link is set to be the new preferred link. Prior to time 910, the filtered signal strength of the O link exceeds the filtered signal strength of the X link, and link O remains the preferred link. At time point 910, the filtered X signal strength equals or slightly exceeds the filtered O signal strength, the WT switches its choice for preferred link from O to X and alters the filter of the new preferred link such that the filtered value of the new preferred link is boosted by 3 dB, as indicated by level shift 912. The filter is designed such that this added gain is set to decay over time. However, this added gain, for at least some time interval following the link switch provides hysteresis, thus preventing undesirable switching back and forth which would otherwise typically occur in a boundary area. For example, consider time 912, following the switch, graph 904 indicates that the O link received signal is slightly higher than the X link received signal which would result in switching back to the O link if the received measurements were used directly; however, at time 912, the filtered X link signal is still above the filtered O link signal preventing undesirable switching.

Figure 10:
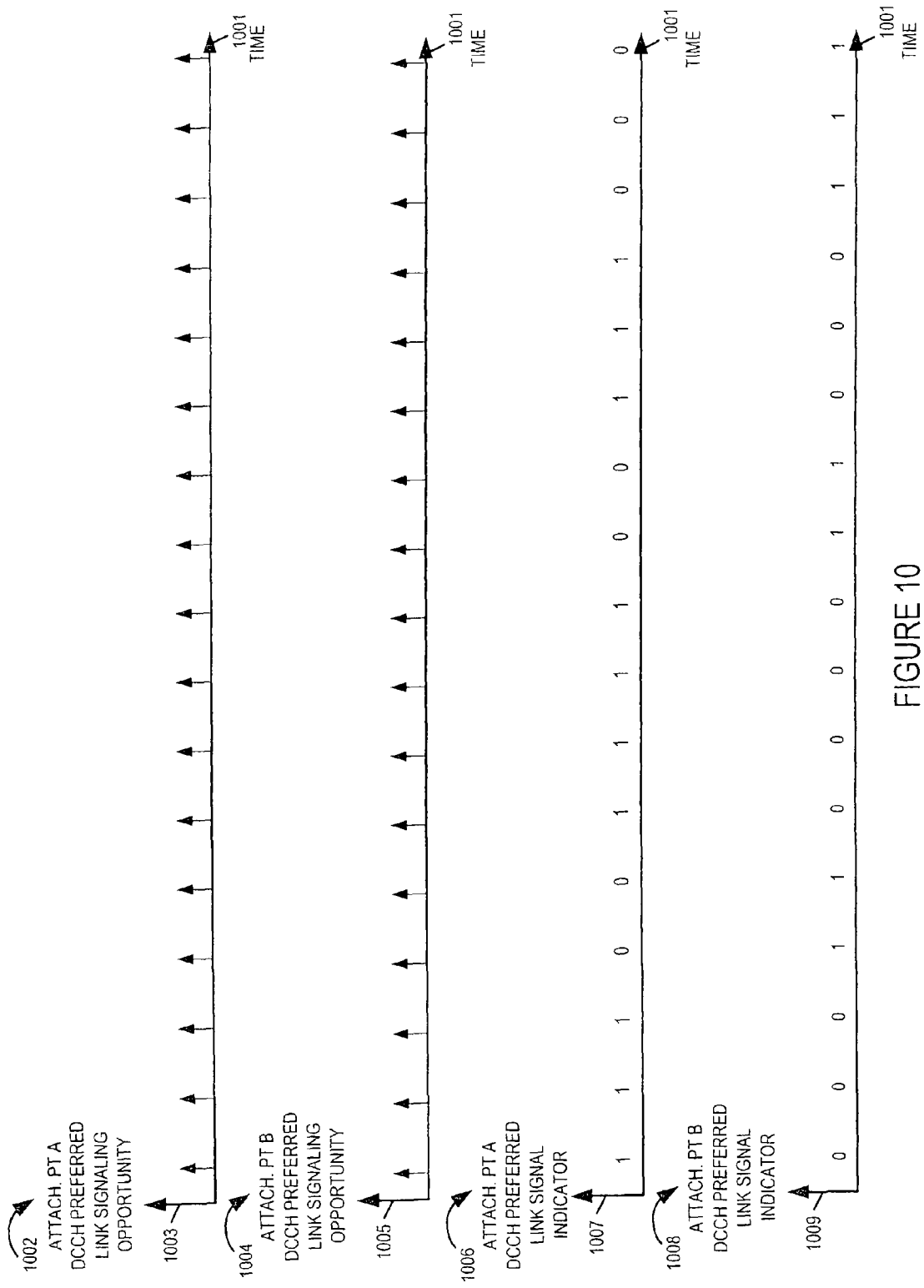
FIG. 10 is a drawing indicating another exemplary embodiment in accordance with the present invention where there is a level of hysteresis in the change of the preferred link.

FIG. 10 is a set of drawings indicating an exemplary embodiment in accordance with the present invention where there is a level of hysteresis in the change of the preferred link. In the FIG. 1002 drawing, the mobile node is attached to attachment point A and attachment point B. When attachment point A is the preferred link, the mobile node is required to signal the same preferred link indicator value for at least N1 successive time intervals to attachment point A before being allowed to change the preferred link to attachment point B, where N1 is a positive integer greater than or equal to 1. When attachment point B is the preferred link, the mobile node is required to signal the same preferred link indicator value for at least N2 successive time intervals before being allowed to change the signaled preferred link to attachment point A, where N2 is a positive integer greater than or equal to 1. In some such embodiments N1 is not equal to N2. For example, in the exemplary embodiment of FIG. 10, N1=3 and N2=2. Furthermore, in some exemplary embodiments, at a given time, the mobile node is not allowed to indicate the same preferred link indicator value to both attachment points A and B.

Drawing 1002 includes a vertical axis 1003, representing attachment point A dedicated control channel preferred link signaling opportunities vs a horizontal axis 1001 representing time. Drawing 1002 illustrates 17 successive signaling opportunities for signaling attachment point A with a preferred link indicator. Drawing 1004 includes a vertical axis 1005, representing attachment point B dedicated control channel preferred link signaling opportunities vs a horizontal axis 1001 representing time. Drawing 1004 illustrates 17 successive signaling opportunities for signaling attachment point B with a preferred link indicator.

Drawing 1006 includes a vertical axis 1007 representing attachment point A dedicated control channel preferred link signal indicator vs a horizontal axis 1001 representing time. Each indicator value of drawing 1006 corresponds to a signaling opportunity of drawing 1002. Drawing 1006 indicates a pattern of indicator signals (1, 1, 1, 0, 0, 1, 1, 1, 1, 0, 0, 1, 1, 1, 0, 0, 0) where an indicator value=1 indicates that the established link corresponding to attachment point A is the preferred link for downlink user data signaling, while an indicator value=0 indicates that the established link corresponding to attachment point A is not the preferred link for downlink user data signaling.

Drawing 1008 includes a vertical axis 1009 representing attachment point B dedicated control channel preferred link signal indicator vs a horizontal axis 1001 representing time. Each indicator value of drawing 1008 corresponds to a signaling opportunity of drawing 1004. Drawing 1008 indicates a pattern of indicator values (0, 0, 0, 1, 1, 0, 0, 0, 0, 1, 1, 0, 0, 0, 1, 1, 1), where an indicator value=1 indicates that the established link corresponding to attachment point B is the preferred link for downlink user data signaling, while an indicator value=0 indicates that the established link corresponding to attachment point B is not the preferred link for downlink user data signaling.

Note that whenever attachment point A is the preferred link, the mobile node signals the same preferred link signaling indicator value successively for at least N1=3 successive time intervals to attachment point A before changing the preference to attachment point B, in accordance with a criteria used in this exemplary embodiment. Additionally, note that whenever attachment point B is the preferred link, the mobile node signals same preferred link signaling indicator value to attachment point B for at least N2=2 successive time intervals to attachment point B before changing the preference to attachment point A in accordance with a criteria used in this exemplary embodiment. Furthermore, in this exemplary embodiment, there are no instances where the two different points of attachment have a different understanding as to which link is the preferred link.

Those skilled in the art will be able to devise numerous arrangements, which, although not explicitly shown or described in FIG. 10, nevertheless embody the principles that are within the scope of the invention. For example, although FIG. 10 was described in the context of the mobile node operating in the same dedicated control channel mode of operation with respect to both attachment points A and B, the invention is also applicable to a situation where the mobile node is operating in the full dedicated channel mode of operation with respect to attachment point A and is operating in a ⅓ dedicated control channel mode of operation with respect to attachment point B. Furthermore, in another embodiment, there may be instances where the mobile node is allowed to signal the same preferred link indicator value to both points of attachment as long as the hysterisis criterion for signaling a preferred link indicator value to each attachment point is not violated.

In some embodiments, no hysteresis is used regarding the switching opportunities for a mobile to switch its preferred link. For example, in some such embodiments, a mobile is provided the opportunity to switch its preferred link corresponding to each set of channel reports. In other such embodiments, a mobile is provided an opportunity to switch its preferred link at predetermined times in a repetitive timing structure, e.g., one switching opportunity per beaconslot, with a beaconslot being a fixed number, e.g., 912, of consecutive OFDM symbol transmission time intervals.

Figure 11:
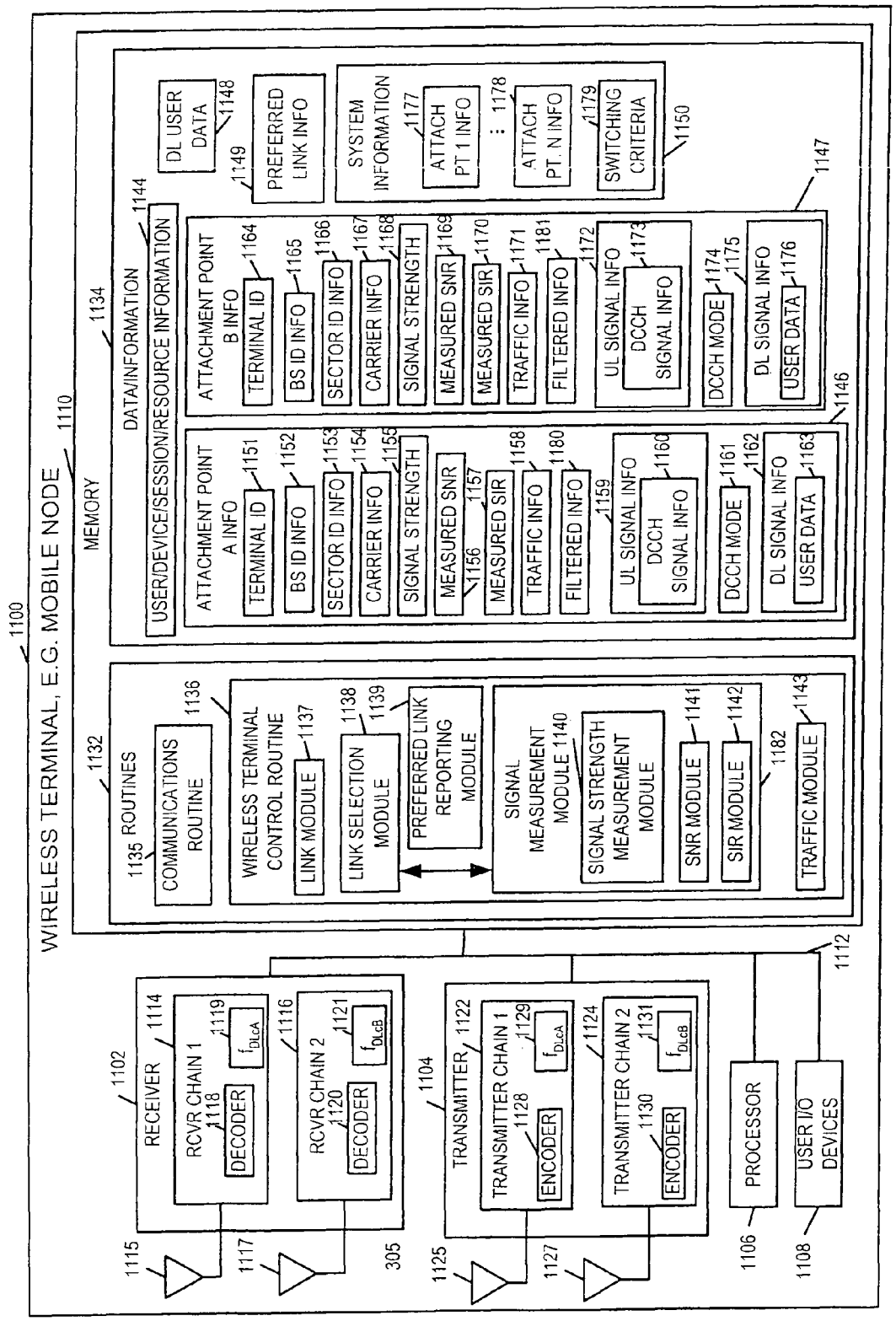
FIG. 11 is a drawing of an exemplary wireless terminal, e.g., mobile node, implemented in accordance with the present invention and using methods of the present invention.

FIG. 11 is a drawing of an exemplary wireless terminal 1100, e.g., mobile node, implemented in accordance with the present invention and using methods of the present invention. Wireless terminal 1100 is, e.g., a mobile node is an exemplary spread spectrum multiple access orthogonal frequency division multiplexing (OFDM) wireless communications system, implemented in accordance with the present invention. Exemplary wireless terminal 1100 includes a receiver 1102, a transmitter 1104, a processor 1106, user I/O devices 1108, and a memory 1110 coupled together via a bus 1112 over which the various elements may interchange data and information.

Receiver 1102, e.g., an OFDM receiver, receives signal from at least two network attachment points. Receiver 1102 includes receiver chain 1 1114 and receiver chain 2 1116. Receiver chain 1114 is coupled to receive antenna 1115 via which downlink signals from a base station attachment point are received. Receiver chain 2 1116 is coupled to receive antenna 1117 via which downlink signals from a base station attachment point are received. Receiver chain 1 1114 includes a decoder 1118 for decoding received downlink signals. Receiver chain 1 1114 can be tuned to different carrier frequencies. Receiver chain 1 1114 is currently tuned to carrier frequency $f_{DLcA}$ 1119 corresponding to the downlink carrier being used by attachment point A. Receiver chain 2 1116 includes a decoder 1120 for decoding received downlink signals. Receiver chain 2 1116 can be tuned to different carrier frequencies. Receiver chain 2 1116 is currently tuned to carrier frequency $f_{DLcB}$ 1121 corresponding to the downlink carrier being used by attachment point B.

Transmitter 1104, e.g., an OFDM transmitter transmits signals, e.g., an indicator, to attachments points indicating whether downlink link from the attachment point to the WT 1100 is the preferred downlink link. In some embodiments, the transmitter 1104 transmits at least one signal to each of the attachment points with which a communications link is maintained to indicate to the attachment point whether or not the downlink link to the attachment point is the preferred downlink selected by the wireless terminal. In some embodiments, for each of the maintained links, a preferred link indicator is communicated via uplink signaling in a dedicated control channel used with the attachment point. Transmitter 1104 includes transmitter chain 1 1122 and transmitter chain 2 1124. Transmitter chain 1 1122 is coupled to transmit antenna 1125 via which uplink signals from the WT 1100 are transmitted to a base station attachment point. Transmitter chain 2 1124 is coupled to transmit antenna 1127 via which uplink signals from the WT 1100 are transmitted to a base station attachment point. Transmitter chain 1 1122 includes an encoder 1128 which encodes data/information for uplink signals. Transmitter chain 2 1124 includes an encoder 1130 which encodes data/information for uplink signals. Transmitter chain 1 1122 can be tuned to different carrier frequencies. Transmitter chain 1 1122 is currently tuned to carrier frequency $f_{UL_cA}$ 1129 corresponding to the uplink carrier being used by attachment point A. Transmitter chain 2 1124 can be tuned to different carrier frequencies. Transmitter chain 2 1124 is currently tuned to carrier frequency $f_{UL_cA}$ 1131 corresponding to the uplink carrier being used by attachment point B. In some embodiments, the same antenna is used for at least some of receiver chain 1 1114, receiver chain 2 1116, transmitter chain 1 1122, and transmitter chain 2 1124, e.g., in conjunction with a duplex module.

User I/O devices 1108, e.g., microphone, keyboard, keypad, mouse, camera, switches, display, speaker, etc., provide an interface for the user of WT 1100 to input user data, output user data, control applications, and control operation of the wireless terminal, e.g., initiate a communications session. Memory 1110 includes routines 1132 and data/information 1134. The processor 1106, e.g., a CPU, executes the routines 1132 and uses the data/information 1134 in memory 1110 to control the operation of the wireless terminal and implement methods of the present invention.

Routines 1132 include a communications routine 1135 and a wireless terminal control routine 1136. The communications routine 1135 implements the various communications protocols used by the wireless terminal. Wireless terminal control routine 1136 controls the operations of the wireless terminal and implements methods of the present invention. Operation of wireless terminal control routine 1136 include performing receiver 1102 control, transmitter 11104 control and user I/O device 1108 control. Wireless terminal control routine 1136 includes a link module 1137, a link selection module 1138, a preferred link reporting module 1139, a signal measurement module 1182, and a traffic module 1143. Signal measurement module 1182 includes a signal strength measurement module 1140, a signal to noise ratio (SNR) module 1141, and a signal to interference ratio module 1142.

Link module 1137 maintains links with a plurality of different attachment points at the same time, e.g., a first wireless link with attachment point A and a second wireless link with attachment point B. Link selection module 1138 selects a preferred downlink wireless link from the maintained communications links. Link selection module 1138 selects a preferred downlink based on at least one of: a determined signal to noise ratio, a determined signal to interference ratio, a received signal strength measurement, traffic loading conditions at one of said attachment points, and a type of traffic to the wireless terminal. Preferred link reporting module 1139 performs operations for signaling the preferred communications link to at least one of the attachment points. In some embodiments, the preferred link reporting module is coupled to the transmitter 1104. In some embodiments, the transmitter 1104 is included as part of the preferred link reporting module. Signal measurement module 1182 measures signals received from at least two network attachment points. The signal measurement module 1182 is coupled to the link selection module 1138 and provides signal measurement information used in selecting a preferred downlink as a function of downlink signals received from at least two attachment points includes in said plurality of attachment points. In some embodiments, the signal measurement module 1143 is a pilot signal measurement module and the selection of a preferred downlink is performed based on measurements of pilot signal signals received from at least two base station attachment points. For example, in some embodiments, received pilots signals from at least two attachment points are measured, processed, e.g., filtered, compared, and used in selecting a preferred downlink. The SNR module 1141 measures a signal to noise ratio of signals received on different links. The SIR module 1142 measures a signal to interference ratio of signal received on different links. Traffic module 1143 tracks traffic loading conditions at different attachment points and types of traffic to be communicated to the wireless terminal. Information from the traffic module 1143 is made available to the link selection module 1138 for consideration in the downlink preferred link selection.

Data/information 1134 includes user/device/session/resource information 1144, downlink user data 1148, attachment point A information 1146, attachment point B information 1147, preferred link information 1149, and system information 1150. User/device/session/resource information 1144 includes device information, e.g., control parameters associated WT 1100's type, model, etc., information associated with a peer node in a communications session with WT 1100, routing information addressing information, air link resource information, e.g., uplink and downlink segments assigned to WT 1100. Downlink user data 1148 includes received frames of user data, e.g., voice data, image data, audio data text, file data, etc. which have been received over one or more of the downlink links. In some embodiments at some times, corresponding to particular ongoing communications session and/or application a first portion of the downlink data stream is received via a first link to a first attachment point and a second portion of the downlink data stream is received via a second link to a second attachment point. Preferred link information 1149 is an output of link selection module 1139 and includes information indicating which link is currently the preferred downlink from the perspective WT 1100. Preferred link info 1149 is used as an input by reporting module 1139.

System information 1150 includes a plurality of sets of attachment point information (attachment point 1 information 1177, . . . , attachment point N information 1178), and switching criteria information 1179. System information 1150 includes system timing/frequency structure and characteristics associated with each of the potential attachment points in the system which may be used by the wireless terminal to establish and maintain a link, e.g., each attachment point corresponding to a base station, sector, and/or carrier frequency. Attachment point 1 information 1177 includes, e.g., information identifying: downlink carrier used, uplink carrier used, identification information used such as pattern of pilot tones, frequency structure information such as number of tones, tone spacing, OFDM symbol transmission time period, grouping of OFDM symbol time periods, segment structure information, tone hopping information, transmitter power level information, preferred link reporting information, etc. Attachment point N information includes a set of information similar to attachment point 1 info 1177 but associated with attachment point N. Switching criteria 1179 includes criteria used by the link selection module 1139 in performing a preferred link selection and/or criteria used by the preferred link reporting module 1139. In some embodiments, switching criteria 1179 is such as to achieve hysteresis.

Attachment point A information 1146 corresponds to a first wireless communications link being maintained with a first attachment point, while attachment point B information 1147 corresponds to a second wireless communications link being maintained with a second attachment point. Each base station attachment point (A,B) couples the wireless terminal 1100 to the network, e.g., providing a communications path to other network nodes via the backhaul network. In accordance with the invention, the wireless terminal 1100 can simultaneously maintain two ongoing links with two attachment points, and can, on an ongoing basis, select a current preferred downlink link and communicate that selection to the attachment points.

Attachment point A information 1146 includes terminal identification information 1151, e.g., a base station assigned identifier associated with a dedicated control channel, base station identification information 1152, e.g., information identifying the base station by beacon tones and/or pilot signaling pattern, sector ID information 1153, e.g., information identifying the sector by beacon tones and/or a pilot tone signaling pattern. Attachment point A information 1146 includes carrier information 1154, e.g., information identifying the uplink and downlink carrier frequencies used by attachment point A and/or the tone blocks used by attachment point A. Attachment point A information 1146 also includes signal strength information 1155, e.g., a measurement of received beacon and/or pilot signals from attachment point A, measured SNR 1156, e.g., a signal to noise ratio associated with received signal from attachment point A, and measured SIR 1157 associated with attachment point A, e.g., a signal to interference measurement based on received beacons, pilots, and/or null tones. Signal strength 1155, measured SNR 1156, and measured SIR 1157 are outputs of the signal measurement module 1182. Attachment point A information 1146 also includes traffic information 1158, e.g., estimated traffic loading at various attachments points under considers such as attachment point A and B and type of traffic information expected to be communicated, e.g., in terms of level of service, priority, latency requirements, and/or application, e.g., voice, text, etc. Traffic information 1158 is an output of the traffic module 1143. Attachment point A information 1146 also includes filtered information 1180, e.g., a filtered value of measured information. For example, in some embodiments, a signal strength of received pilot signals from attachment point A are measured and filtered, and the filtered value is adjusted, e.g., when the preferred link changes such as to provide hysteresis. Attachment point A information 1146 also includes uplink signal information 1159, dedicated control channel (DCCH) mode information 1161, and downlink signal information 1162. Uplink signal information 1159 includes DCCH signal information 1160, e.g., DCCH reports including a preferred link indicator. Downlink signal information 1162 includes downlink user data 1163, e.g., frames of downlink user data communicated over the downlink communications link corresponding to attachment point A.

Attachment point B information 1147 includes terminal identification information 1164, base station identification information 1165, sector ID information 1166, carrier information 1167, signal strength information 1168, measured SNR 1169, measured SIR 1170, traffic information 1171, filtered information 1181, uplink signal information 1172, dedicated control channel (DCCH) mode information 1174, and downlink signal information 1175. Uplink signal information 1172 includes DCCH signal information 1173. Downlink signal information 1175 includes downlink user data 1176. The attachment point B information is similar to the attachment point A information but corresponds to a different wireless communications link, and thus is not described in detail.

Figure 12:
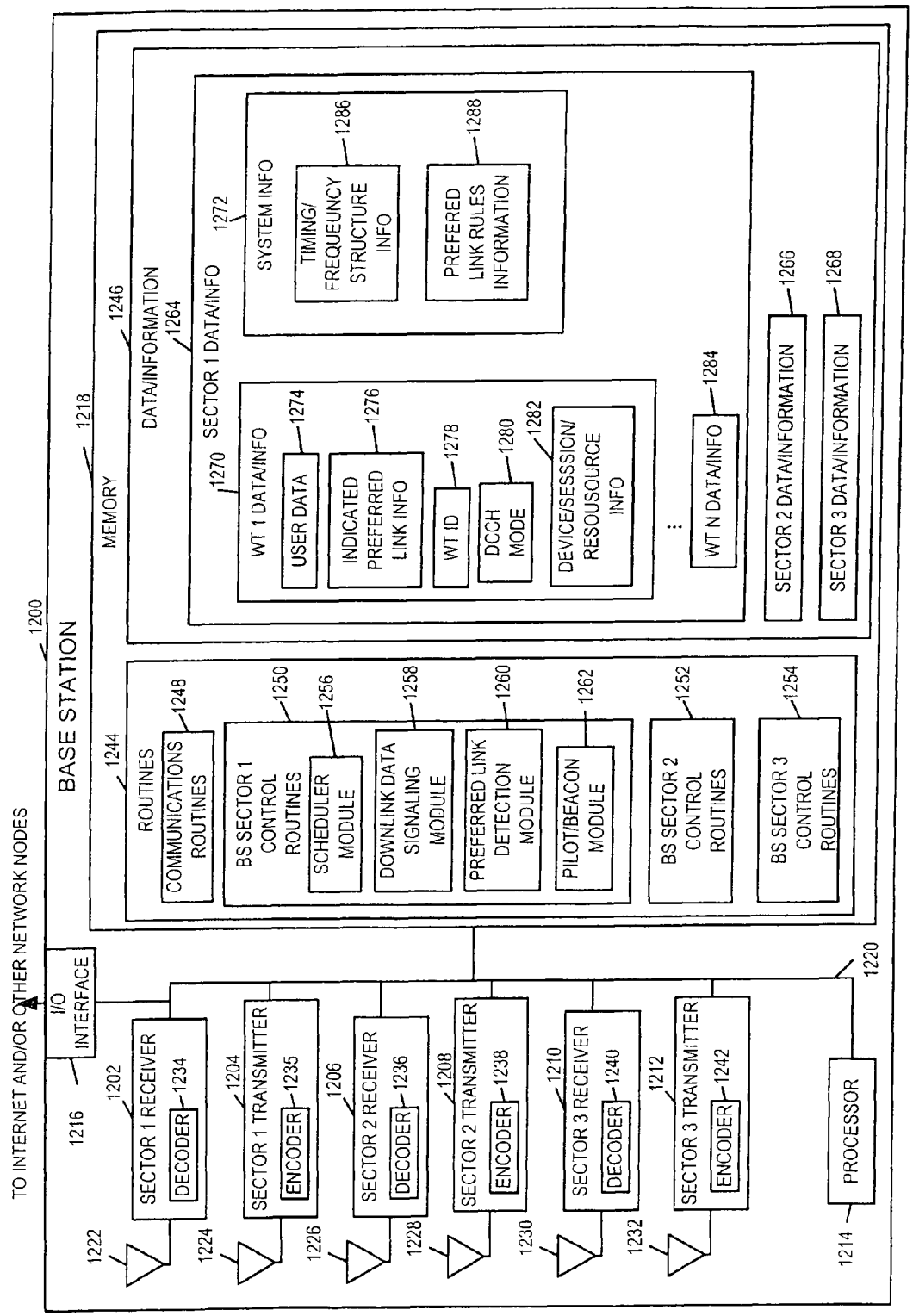
FIG. 12 is a drawing of an exemplary base station, e.g., access node, implemented in accordance with the present invention and using methods of the present invention.

FIG. 12 is a drawing of an exemplary base station 1200, e.g., access node, implemented in accordance with the present invention and using methods of the present invention. Exemplary base station 1200 is, e.g., an exemplary OFDM base station in an OFDM spread spectrum multiple access wireless communications system. Exemplary base station 1200 is a three sector base station. Other base station, in accordance with the present invention may include a different number of sectors, e.g., one, two, or more than three sectors. In the exemplary embodiment of FIG. 12, the base station 1200 is described as providing three attachment points one for each sector. In some embodiments, each sector may correspond to multiple attachment points. For example a given sector may support multiple tone blocks, e.g., three downlink tone blocks, and each tone block of each sector may correspond to an attachment point. In one such embodiment using three downlink tone blocks or three downlink carriers per sector, a three sector base station has nine different points of attachment.

Exemplary base station 1200 includes a receiver and a transmitter corresponding to each sector (sector 1 receiver 1202, sector 1 transmitter 1204, sector 2 receiver 1206, sector 2 transmitter 1208, sector 3 receiver 1210, sector 3 transmitter 1212). Each receiver (1202, 1206, 108) is coupled to a corresponding sector receive antenna (1222, 1226, 1230) respectively, via which the base station sector receiver receives uplink signals from wireless terminals. The uplink signals include dedicated control channel reports including preferred link indicator information. The receivers (1202, 1206, 1210) include decoders (1234, 1238, 1240), respectively, for decoding the received uplink signals.

Each transmitter (1204, 1208, 1212) is coupled to a corresponding sector transmit antenna (1224, 1228, 1230), respectively, via which the base station sector transmits downlink signals to wireless terminals, e.g., downlink signals including user data communicated via traffic channel segments. The transmitters (1204, 1208, 1212) include encoders (1235, 1238, 1242), respectively, for encoding downlink signals The base station 1200 also includes a processor 1204, I/O interface 1216, and memory 1218. The various devices (1202, 1204, 1206, 1208, 1210, 1214, 1216, and 1218) are coupled together via a bus 1220 over which the various elements may interchange data and information.

The I/O interface 1216 couples the base station 1200 to the Internet and/or other network nodes, e.g., other base station, routers, home agent nodes, AAA nodes, centralized control node, etc. The I/O interface 1216 couples the base station 1200 to the backhaul network thus providing a communications path for wireless terminals using one of base stations 1200's attachment points to be able to communicate with other wireless terminals located in different cells and using an attachment point corresponding to a different base station.

Memory 1218 includes routines 1244 and data/information 1246. Processor 1214, e.g., a CPU, executes the routines 1244 and uses the data/information in memory 1218 to control the operation of base station 1200, including operation of the receivers, transmitters and I/O interface 1216, and implements the methods of the present invention. Routines 1244 includes communications routines 1248, base station sector 1 routines 1250, base station sector 2 routines 1252, and base station sector 3 routines 1254.

Communications routine 1248 implements various communications protocols used by the base station 1200. Base station sector 1 control routines 1250 control operations related to sector 1; base station sector 2 control routines 1252 control operations related to sector 2; base station sector 3 control routines 1254 control operations related to sector 3. Base station sector 1 control routines 1250 includes a scheduler module 1256, a downlink data signaling module 1260, a preferred link detection module 1260, and a pilot/beacon signaling module 1262. Scheduler module 1256, e.g., a scheduler schedulers air link resources, e.g., uplink and downlink channel segment to wireless terminals use the base station sector 1 as their point of attachment. Downlink data signaling module 1258 controls the user data forwarded to the sector 1 transmitter to be communicated over the downlink links being maintained between the sector 1 transmitter and wireless terminals. Preferred link detection module 1260 processes information from uplink signals for each of the wireless terminals to which a link is being maintained and determines whether the wireless terminal considers the downlink to be the current preferred downlink, e.g., via a preferred link indicator value communicated in a dedicated control channel. Pilot/beacon module 1262 generates beacon and/or pilot signals in accordance with a timing and frequency structure used by base station sector, e.g., specific tones are used at specific times in a recurring sequence. The received pilot and/or beacon signals are, in some embodiments, are measured and used by the wireless terminals in selecting a preferred downlink. The scheduler module 1256 and/or the downlink data signaling module 1258 decides what downlink user data should be communicated to wireless terminals in accordance with whether or not the downlink is the preferred link for the wireless terminal and in accordance with the preferred link rules information 1288. In some embodiments, the base station 1200 may collaborate with other nodes, e.g., other base stations and/or centralized nodes in making decisions as the what information to communicate on a downlink.

Data/information 1246 includes a plurality of sets of data information (sector 1 data/information 1264, sector 2 data/information 1266, sector 3 data/information 1268). Sector 1 data/information 1264 includes a plurality of sets of WT information (WT 1 data/information 1270, . . . , WT N data/information 1284), each corresponding to a WT being serviced by the base station sector attachment point. WT 1 data/information 1274 includes user data 1274, e.g., voice data, audio data, image data, text data, file data, which may be communicated in frames over the downlink link being maintained, indicated preferred link information 1276, e.g., a indictor value recovered by module 1260 identifying as to whether or not the downlink link is considered the preferred downlink at the current time, a wireless terminal identifier 1278, e.g. A base station assigned active user identifier associated with a DCCH channel segment, a DCCH mode, e.g., a full DCCH mode or a ⅓ DCCH mode, and device/session/resource information 1282. Device/session/resource information 1282 includes information associated with WT1, e.g., device type and control parameters, information associated with peer nodes in a communications session with WT 1, addressing information, routing information, and air link resource information, e.g., uplink and downlink segments assigned to WT 1 by scheduler module 1256.

Sector 1 data/information 1264 also includes system information 1272. System information 1272 includes timing/frequency structure information 1286 and preferred link rules information. Timing frequency structure information includes carrier frequencies, tone information, tone spacing information, tone block information, OFDM symbol timing information, grouping of OFDM symbol time intervals, recurring pattern information, and tone hopping information. Preferred link rules information includes information such as rules and protocols to use identifying procedures to follow regarding downlink signaling when a downlink link corresponding to a WT is considered preferred and procedures to follow regarding downlink signaling when a downlink link corresponding to a WT is considered the non-preferred link. In some embodiments, the preferred link rules information 1288 may be changed dynamically. In some embodiments, the preferred link rules information may be different corresponding to different wireless terminal, different types of wireless terminal, and/or different classification of data flows.

Various embodiments may have different division of routines and/or data/information in terms of what is shared among sectors and what is specific to an individual sector.

Features of the invention can be implemented using one or more modules. Modules used to implement the invention can be implemented using software, hardware or as a combination of software and hardware.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more communications network nodes. Accordingly, among other things, the present invention is directed to machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A wireless terminal in communication with at least a first communication station of a plurality of communication stations over a first wireless communication link, the wireless terminal comprising:
    a processor; and
    circuitry coupled to the processor, the circuitry and the processor being cooperatively configured to:
        receive a first signal from a second communication station over a second wireless communication link;
        receive a second signal from a third communication station over a third wireless communication link;
        identify one of the second wireless communication link and the third wireless communication link for receiving data based on a comparison of a signal measurement of the first signal and a signal measurement of the second signal;
        transmit to at least one of the second communication station and the third communication station an indicator identifying the one of the second wireless communication link and the third wireless communication link for receiving data; and
        maintain communication of data over the first wireless communication link for a plurality of time intervals until data is directed over the identified one of the second wireless communication link and the third wireless communication link.

2. The wireless terminal of claim 1, wherein the first communication station is the same as the second communication station, and wherein the first wireless communication link is the same as the second wireless communication link.

3. The wireless terminal of claim 1, wherein the signal measurement of the first signal comprises at least one of a received pilot signal strength, a received beacon signal strength, a signal-to-noise ratio (SNR), a signal-to-interference ratio (SIR), a sector load, and a type of traffic.

4. The wireless terminal of claim 1, wherein the comparison of the signal measurement of the first signal and the signal measurement of the second signal comprises determining whether the signal measurement of one of the first signal and the second signal is greater than the signal measurement of another one of the first signal and the second signal by a threshold value.

5. The wireless terminal of claim 4, wherein the circuitry and the processor are further cooperatively configured to increase the threshold value for a predetermined time period when data is directed over the identified one of the second wireless communication link and the third wireless communication link.

6. The wireless terminal of claim 1, wherein the circuitry and the processor are further cooperatively configured to transmit to at least one of the second communication station and the third communication station another indicator identifying the one of the first wireless communication link and the second wireless communication link for receiving data during the plurality of time intervals.

7. The wireless terminal of claim 1, wherein the plurality of time intervals comprises a plurality periods in which channel conditions are reported.

8. The wireless terminal of claim 1, wherein the circuitry and the processor are further cooperatively configured to maintain the communication for the plurality of time intervals to maintain a predetermined level of hysteresis during communication.

9. A method of communicating with at least a first communication station of a plurality of communication stations over a first wireless communication link, the method comprising:
receiving a first signal from a second communication station over a second wireless communication link;
receiving a second signal from a third communication station over a third wireless communication link;
identifying one of the second wireless communication link and the third wireless communication link for receiving data based on a comparison of a signal measurement of the first signal and a signal measurement of the second signal;
transmitting to at least one of the second communication station and the third communication station an indicator identifying the one of the second wireless communication link and the third wireless communication link for receiving data; and
maintaining communication of data over the first wireless communication link for a plurality of time intervals until data is directed over the identified one of the second wireless communication link and the third wireless communication link.

10. The method of claim 9, wherein the first communication station is the same as the second communication station, and wherein the first wireless communication link is the same as the second wireless communication link.

11. The method of claim 9, wherein the signal measurement of the first signal comprises at least one of a received pilot signal strength, a received beacon signal strength, a signal-to-noise ratio (SNR), a signal-to-interference ratio (SIR), a sector load, and a type of traffic.

12. The method of claim 9, wherein the comparison of the signal measurement of the first signal and the signal measurement of the second signal comprises determining whether the signal measurement of one of the first signal and the second signal is greater than the signal measurement of another one of the first signal and the second signal by a threshold value.

13. The method of claim 12, further comprising increasing the threshold value for a predetermined time period when data is directed over the identified one of the second wireless communication link and the third wireless communication link.

14. The method of claim 9, further comprising transmitting to at least one of the second communication station and the third communication station another indicator identifying the one of the first wireless communication link and the second wireless communication link for receiving data during the plurality of time intervals.

15. The method of claim 9, wherein the plurality of time intervals comprises a plurality periods in which channel conditions are reported.

16. The method of claim 9, further comprising maintaining the communication for the plurality of time intervals to maintain a predetermined level of hysteresis during communication.

17. A wireless terminal in communication with at least a first communication station of a plurality of communication stations over a first wireless communication link, the wireless terminal comprising:
means for receiving a first signal from a second communication station over a second wireless communication link;
means for receiving a second signal from a third communication station over a third wireless communication link;
means for identifying one of the second wireless communication link and the third wireless communication link for receiving data based on a comparison of a signal measurement of the first signal and a signal measurement of the second signal;
means for transmitting to at least one of the second communication station and the third communication station an indicator identifying the one of the first wireless communication link and the second wireless communication link for receiving data, wherein the means for transmitting is coupled to the means for identifying; and
means for maintaining communication of data over the first wireless communication link for a plurality of time intervals until data is directed over the identified one of the second wireless communication link and the third wireless communication link, wherein the means for maintaining is coupled to the means for identifying.

18. The wireless terminal of claim 17, wherein the first communication station is the same as the second communication station, and wherein the first wireless communication link is the same as the second wireless communication link.

19. The wireless terminal of claim 17, wherein the signal measurement of the first signal comprises at least one of a received pilot signal strength, a received beacon signal strength, a signal-to-noise ratio (SNR), a signal-to-interference ratio (SIR), a sector load, and a type of traffic.

20. The wireless terminal of claim 17, wherein the comparison of the signal measurement of the first signal and the signal measurement of the second signal comprises determining whether the signal measurement of one of the first signal and the second signal is greater than the signal measurement of another one of the first signal and the second signal by a threshold value.

21. The wireless terminal of claim 20, wherein the means for identifying is further configured to increase the threshold value for a predetermined time period when data is directed over the identified one of the second wireless communication link and the third wireless communication link.

22. The wireless terminal of claim 17, wherein the means for transmitting is further configured to transmit to at least one of the second communication station and the third communication station another indicator identifying the one of the first wireless communication link and the second wireless communication link for receiving data during the plurality of time intervals.

23. The wireless terminal of claim 17, wherein the plurality of time intervals comprises a plurality periods in which channel conditions are reported.

24. The wireless terminal of claim 17, wherein the means for maintaining is further configured to maintain the communication for the plurality of time intervals to maintain a predetermined level of hysteresis during communication.

25. A computer program product for communicating with at least a first communication station of a plurality of communication stations over a first wireless communication link, comprising:
  a non-transitory computer-readable medium comprising:
    code for causing a computer to receive a first signal from a second communication station over a second wireless communication link;
    code for causing a computer to receive a second signal from a third communication station over a third wireless communication link;
    code for causing a computer to identify one of the second wireless communication link and the third wireless communication link for receiving data based on a comparison of a signal measurement of the first signal and a signal measurement of the second signal;
    code for causing a computer to transmit to at least one of the second communication station and the third communication station an indicator identifying the one of the second wireless communication link and the third wireless communication link for receiving data; and
    code for causing a computer to maintain communication of data over the first wireless communication link for a plurality of time intervals until data is directed over the identified one of the second wireless communication link and the third wireless communication link.

26. The computer program product of claim 25, wherein the first communication station is the same as the second communication station, and wherein the first wireless communication link is the same as the second wireless communication link.

27. The computer program product of claim 25, wherein the signal measurement of the first signal comprises at least one of a received pilot signal strength, a received beacon signal strength, a signal-to-noise ratio (SNR), a signal-to-interference ratio (SIR), a sector load, and a type of traffic.

28. The computer program product of claim 25, wherein the comparison of the signal measurement of the first signal and the signal measurement of the second signal comprises determining whether the signal measurement of one of the first signal and the second signal is greater than the signal measurement of another one of the first signal and the second signal by a threshold value.

29. The computer program product of claim 28, wherein the computer-readable medium further comprises code for causing a computer to increase the threshold value for a predetermined time period when data is directed over the identified one of the second wireless communication link and the third wireless communication link.

30. The computer program product of claim 25, wherein the computer-readable medium further comprises code for causing a computer to transmit to at least one of the second communication station and the third communication station another indicator identifying the one of the first wireless communication link and the second wireless communication link for receiving data during the plurality of time intervals.

31. The computer program product of claim 25, wherein the plurality of time intervals comprises a plurality periods in which channel conditions are reported.

32. The computer program product of claim 25, wherein the computer-readable medium further comprises code for causing a computer to maintain the communication for the plurality of time intervals to maintain a predetermined level of hysteresis during communication.

* * * * *